US00RE34170E

United States Patent [19]

Stahlecker et al.

[11] E Patent Number: Re. 34,170

[45] Reissued Date of Patent: Feb. 2, 1993

[54] SPINNING UNIT PIECING PROCESS FOR PRODUCING FEED SPOOLS

[76] Inventors: Fritz Stahlecker, Josef-Neidhart-Strasse 18, 7347 Bad Überkingen; Hans Stahlecker, Haldenstrasse 20, 7334 Süssen, both of Fed. Rep. of Germany

[21] Appl. No.: 626,548

[22] Filed: Dec. 12, 1990

Related U.S. Patent Documents

Reissue of:

[64] Patent No.: 4,790,130
Issued: Dec. 13, 1988
Appl. No.: 105,813
Filed: Oct. 8, 1987

[30] Foreign Application Priority Data

Oct. 9, 1986 [DE] Fed. Rep. of Germany ..... 3634464

[51] Int. Cl.[5] ..... D01H 15/00
[52] U.S. Cl. ..... 57/261; 57/328
[58] Field of Search ..... 57/261, 263, 22, 328, 57/315, 332, 333, 350, 78, 83, 352

[56] References Cited

U.S. PATENT DOCUMENTS

| | | | |
|---|---|---|---|
| 4,121,409 | 10/1978 | Uchida et al. | 57/328 X |
| 4,419,861 | 12/1983 | Fujiwara et al. | 57/261 |
| 4,484,436 | 11/1984 | Nakayama et al. | 57/328 |
| 4,535,944 | 8/1985 | Nakahara et al. | 57/261 X |
| 4,619,109 | 10/1986 | Suzuki et al. | 57/261 |
| 4,620,413 | 11/1986 | Anahara et al. | 57/261 |

FOREIGN PATENT DOCUMENTS 126659 11/1984 European Pat. Off. .

*Primary Examiner*—Joseph J. Hail, III
*Attorney, Agent, or Firm*—Evenson, Wands, Edwards, Lenahan & McKeown

[57] ABSTRACT

In the case of a process for piecing at a spinning unit that is used for producing feed spools consisting of multiple-wound, prestrengthened slivers for a subsequent twisting operation or the like, it is provided that first the supply of the drafting roller device is started, after which the slivers are sucked into the pneumatic false-twisting devices, are guided through them and are then jointly gripped at the outlet of the false-twisting devices, are placed in a withdrawal device and are then fed to a winding-up device.

47 Claims, 1 Drawing Sheet

SPINNING UNIT PIECING PROCESS FOR PRODUCING FEED SPOOLS

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to an arrangement and a process for piecing at a spinning unit that is used for producing feed spools consisting of multiple-wound, prestrengthened slivers for a subsequent twisting process or the like. The spinning unit contains two drafting or drawing roller units that each supply one sliver to a device for false-twisting. Following are a device for withdrawing the false twisted slivers as well as apparatus for the joint winding-up of the silvers, which slivers were prestrengthened by means of the false-twisting, onto a feed spool.

In the case of a known spinning unit of the initially mentioned type (European Patent Application EP-A No. 126 659), the two slivers are drawn in the drafting or drawing roller devices to the desired yarn count and subsequently pass through a false-twisting device. From the false-twisting device, they are withdrawn by means of a withdrawing device and are then wound up. Although the false twist that was introduced in the false-twisting device opens up again after the passage is completed, a certain strengthening remains, particularly a winding of the ends of the outer fibers around the sliver core. The two prestrengthened slivers are wound up jointly and in a multiple shape. The resulting spool is used as the feed spool for a twisting that is carried out in a next work step. During the piecing, that is not disclosed in detail, a filament yarn is added to the two slivers as an auxiliary yarn for the purpose of strengthening, which filament yarn is fed in the area of the pair of delivery rollers of the drawing roller devices. The auxiliary yarn, together with the slivers, moves through the false-twisting device and the withdrawal device until it is sucked off. Subsequently, the two filament yarns are cut, after which the slivers that no longer contain any filament yarn are wound onto a spool.

An objective of the invention is to provide a process for piecing that can be carried out in a simple and fast way and is also suitable for automation.

This objective is achieved according to the invention by providing that first the supply of the drafting roller devices is started, after which the slivers are sucked into the pneumatic false-twisting devices and are guided through them and are than gripped jointly, at the outlet of the false-twisting devices, and are placed in a withdrawal device and are fed to a winding-up device.

In the case of the process according to the invention, the adding of auxiliary yarn for the strengthening of the slivers is superfluous so that the expenditures are less than with the above-noted system. In addition, this piecing process can be carried out relatively rapidly, since the two slivers, after passing through the pneumatic false-twisting device, are gripped and processed jointly. This leads to no significantly increased stress for the slivers compared to the normal spinning process, particularly because the supply of the slivers is switched on in time. In this case, it is contemplated in preferred embodiments to place the slivers jointly first in the withdrawal device and then lead them to the winding-up device, or to feed them first to the winding-up device and subsequently insert them in the withdrawal device.

According to certain preferred embodiments of the invention, it is provided that the slivers are first sucked off by means of suction devices that are connected behind the drafting roller devices, before they are taken over by the false-twisting devices and are sucked into them. By means of this intermediate step, it can be ensured that the two slivers move correctly through the drafting roller devices so that the danger of obstructions or the like of the pneumatic false-twisting devices is reduced. In an advantageous development, it is provided that the suction devices, before or during the starting of the sliver supply of the drafting roller devices, are brought into the area of the pairs of delivery rollers of the drafting roller devices and are subsequently moved out of this area, in which case the pneumatic false-twisting devices follow into the area of the pairs of delivery rollers and then take over the slivers. In this way, a clean transfer of the slivers delivered by the drafting roller devices to the pneumatic false-twisting devices can be carried out that is also particularly suitable for an automatic operation.

In a further development of certain preferred embodiments of the invention, it is provided that at the outlet of the false-twisting devices, a suction gripper is connected that receives both slivers, inserts the slivers jointly into the withdrawal device and guides them to the winding-up device. This type of suction gripper has the advantage that it securely receives the slivers that must be received simultaneously and holds them under tension without requiring special measures for the adaptation to the delivery speed of the slivers. This is also advantageous for the conveying of the slivers for the purpose of inserting them into the withdrawal device and, as required, into other devices and for the transfer to the winding-up device, because in this case it is also not necessary to adapt the gripping movement precisely to the delivery speed of the slivers.

In a further development of preferred embodiments of the invention, it is provided that for each piecing operation, an empty spool shell is inserted into the winding up device to which the slivers are transferred that are fed jointly during the piecing. This development of the invention is based on the fact that the frequency of sliver breakage is very low so that the piecing must essentially only be carried out when the feed spool is full onto which the two slivers are wound, and/or the sliver supply from which the slivers are withdrawn is used up.

In a further development of preferred embodiments of the invention, it is provided that the slivers that, at the time of the piecing, are taken over jointly at the outlet of the false-twisting devices, before a renewed winding-up, are connected with sliver ends withdrawn from the produced feed spool. Splicing is particularly suitable for the connection.

In a further development of preferred embodiments of the invention, it is provided that in the area behind the false-twisting devices, the presence of the sliver is monitored and that, in the case of a breakage of one or both slivers, the supply of both slivers is interrupted. In a further development of the invention, it is provided that the slivers are monitored before they enter into the drafting roller devices, and that, when one sliver is absent, the further supply of the drafting roller devices is interrupted. In this way, it is securely prevented that it is not noticed that only one sliver is wound onto the spool.

In a further development of preferred embodiments of the invention, it is provided that, when the sliver supply is interrupted, the pneumatic false-twisting devices are moved out of the area of the pairs of delivery rollers of the drafting roller devices and suction devices are moved into this area. This measure, similarly to the interruption of the supply of the slivers, can be controlled via yarn guards.

Other objects, advantages and novel features of the present invention will become apparent from the following detailed description of the invention when considered in conjunction with the accompanying drawings.

DETAILED DESCRIPTION OF THE DRAWINGS

Figure 1:
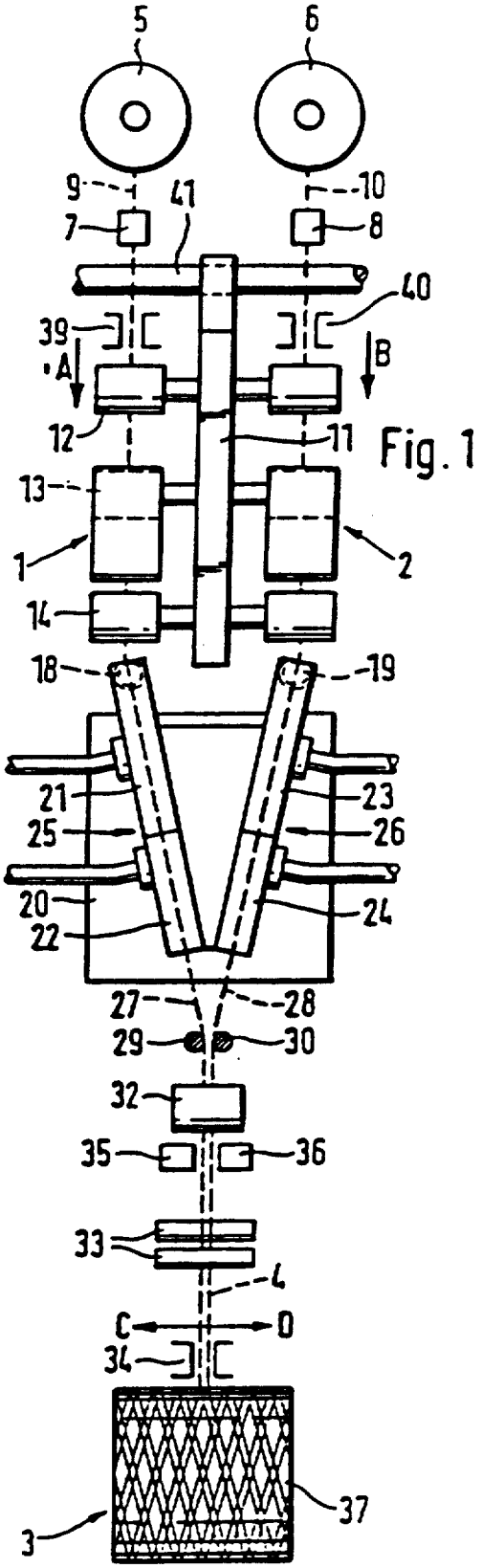
FIG. 1 is a front schematic view of an individual spinning unit of a multi-unit spinning machine that is equipped with a preferred embodiment of the present invention.
Figure 2:
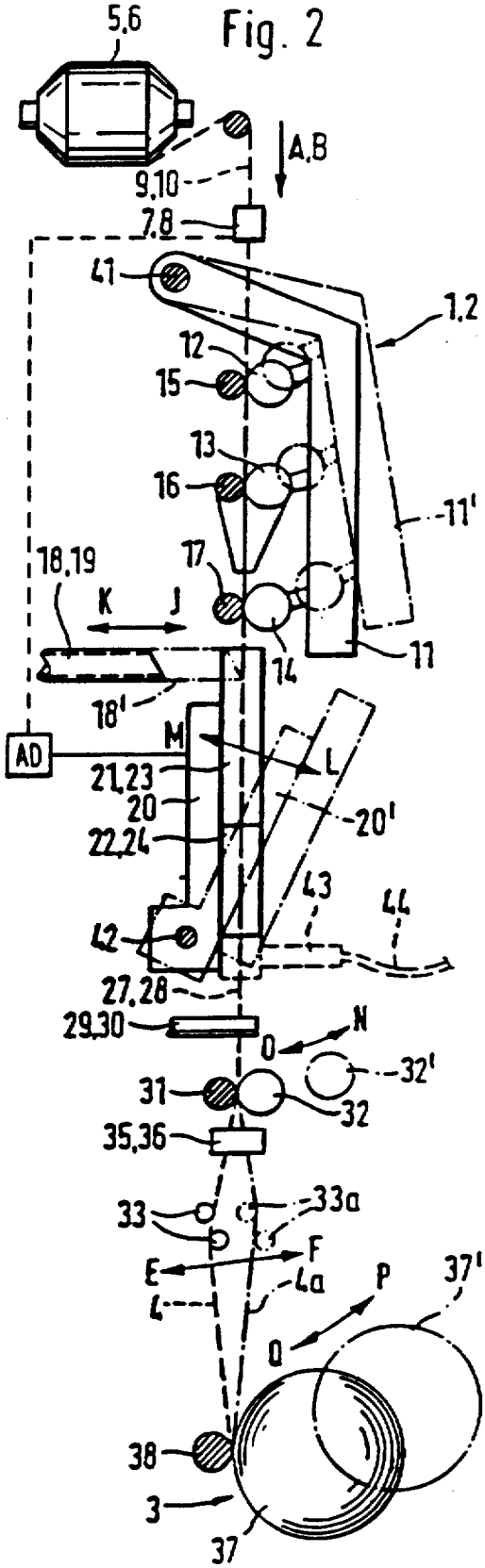
FIG. 2 is a lateral schematic view of the spinning unit according to FIG. 1.

For purposes of an explanation, it is noted at this point that in FIG. 1 as well as in FIG. 2, for reasons of a clear representation, certain components are not shown that are also shown in the respective other view.

The shown spinning unit contains two drafting roller devices 1, 2 that each withdraw a respective sliver 9, 10 from a supply spool 5, 6 and draw it to the desired yarn count. Instead of supply spools 5, 6, spinning cans or the like may also be provided. The drafted or drawn slivers 9, 10 are supplied from the drafting roller devices 1, 2 to respective pneumatic false-twisting device 25, 26 from which the slivers 9, 10 are delivered as prestrengthened slivers 27, 28. The prestrengthened slivers 27, 28 are guided together by means of yarn guides 29, 30 and are withdrawn by means of a joint pair of withdrawal rollers 31, 32. The guided-together, prestrengthened slivers 27, 28 that form a double yarn 4, after passing through a yarn balancing device 33, are wound onto a feed spool 37 in a wind-up device 3 that, during a subsequent processing step, is fed to a twisting machine. The wind-up device 3, in addition to the holding arrangement for the feed spool that is not shown, contains a driving roller 38 for the feed spool 37 as well as a cross-winding device 34 that can be moved back and forth in the direction of the arrows C and D so that the double yarn 4 is wound up to a form cross-wound spool.

The drafting roller devices 1, 2 each have lower rollers 15, 16, 17 that are developed as driven cylinders passing through in the longitudinal direction of the machine, upper rollers 12, 13, 14 being assigned to respective lower rollers 15, 16, 17 to form pressure roller twins. The upper rollers 12, 13, 14 of the drafting rollers devices 1, 2 are held by means of a joint carrying and load arm 11 that can be pivoted around a shaft 41 extending in the longitudinal direction of the machine into a position 11' in which the upper rollers 12, 13, 14 are lifted off the pertaining lower rollers 15, 16, 17. In the inlet area to the drafting roller devices 1, 2 which the slivers 9,10 enter in the direction of the Arrows A and B, yarn clamps 39, 40 are arranged, in front of which yarn guards 7, 8 are connected. The yarn guards 7, 8 are connected in such a way that, when one of the slivers 9 or 10 is absent, both yarn clamps 39, 40 are closed. The yarn guards 7, 8 are also connected to a pneumatic cylinder actuating drive or the like for the carrying and load arm 11, by means of which it can be swivelled into the inoperative position 11'.

The pneumatic false-twisting devices 25, 26 that are connected behind the drafting roller devices 1, 2 each comprise a false-twisting nozzle 22, 24 and a respective injector nozzle 21, 23 connected in front of it. The injector nozzles 21, 23 and the false-twisting nozzles 22, 24 are connected to a compressed-air source that is not shown via compressed-air supply lines. They are held on a joint holding device 20 that can be pivoted around a shaft 42 extending in the longitudinal direction of the machine into the dash-dotted inoperative position 20' in the direction of the Arrows M and L. In the operative position, the inlets of the injector nozzles 21, 23 are located in the area of the pairs 14, 17 of delivery rollers of the drafting roller devices 1, 2. As shown in FIG. 1, the injector nozzles 21, 23 and the false-twisting nozzles 22, 24 are arranged in a V-shape with respect to one another, so that the slivers 9, 10 are guided closer to one another already in this area and are then guided together as prestrengthened slivers 27, 28 by means of the yarn guides 29, 30.

In the area behind the pairs of delivery rollers 14, 17 of the drafting roller devices 1, 2, two suction pipes 18,19 are located that can be moved from a withdrawn position that is shown by solid lines into the direction of the Arrows K and I into an advanced dash-dotted line depicted position 18' in which they are then located directly in the area of the pairs of delivery rollers 17, 14. However, this advancing of suction pipes 18, 19 is only possible when the injector nozzles 21, 23 are moved out of this area. Advantageously, a joint holding device and a joint adjusting drive are provided for the holder 20 and a holder receiving the suction pipes 18, 19. The holder 20 and the holder for the suction pipes 18, 19 are equipped with an adjusting drive that is not shown, such as a pneumatic cylinder, that is also controlled by the yarn guards 7, 8. Reference is made to our copending U.S. application Ser. No. 108,218, filed Oct. 14, 19874, based on German priority application No. P 36 38 110.1, filed in Germany on Nov. 7, 1986, which describes a joint holding device construction which could be used with the present invention.

The pair of withdrawal rollers 31, 32 comprise a driven cylinder 31 that moves through in the longitudinal direction of the machine and a pressure roller 32 that can be swivelled in the direction of the Arrows 0 and N and can take up an inoperative position 32'.

The balancing device 33 is used for the balancing of the cross-winding movement of the cross-winding device 34 during which an increase of the yarn tension must be avoided. The balancing device 33 can be moved in the direction of the Arrows E and F between position 33 and position 33a. Reference is made to our copending U.S. application Ser. No. 105,544, filed Oct. 8, 1987, based on German priority application No. P 36 38 185.3 filed in Germany on Nov. 8, 1986, which discloses a balancing device which could be used with our present invention.

Connected behind the pair 31, 32 of withdrawal rollers are yarn guards 35, 36 that monitor the presence of the prestrengthened slivers 27, 28. These yarn guards 35, 36 are connected in parallel to the yarn guards 7,8; i.e., they also actuate the yarn clamps 39, 40, the carrying and load arm 11 and the holder 20. The pressure roller 32 may also be equipped with an actuating drive by means of which it can be swivelled into the inoperative position 32'. However, since this swivelling is required only in the case of the piecing that will still be explained, it may, during the piecing, also be carried out manually or, if desired, by means of an automatic device.

As shown in FIG. 2, the feed spool 37 may also be swivelled in the direction of the Arrows Q and P into an inoperative position 37'. This may also be controlled via the yarn guards 7, 8 or 35, 36 by means of an actuating drive, such as a pneumatic cylinder, or, as desired, manually or by means of an automatic piecing device.

At the start of the piecing process, the holder 20, with the injector nozzles 21, 23 and the false-twisting nozzles 22, 24, is in position 20' shown in FIG. 2 by an interrupted line. The suction pipes 18, 19 are also in the position 18' shown by an interrupted line in the area of the pair of delivery rollers 14, 17 of the drafting roller arrangement 1, 2. In this position 18', the sliver supply is switched on by the drafting roller arrangement 1, 2. For this purpose, the sliver clamps 39, 40 are opened up, and the slivers 9, 10 are conveyed to the suction tubes 18, 19. For this purpose, the drafting roller arrangement 1, 2 may already be closed; i.e., the carrying and load arm 11 is located in the operative position, The slivers 9, 10 that are then conveyed first enter the suction pipes 18, 19.

Subsequently, the injector nozzles 21, 23 and the false-twisting nozzles 22, 24 are brought into the operative position, in which they are located in the area of the pair of delivery rollers 14, 17 of the drafting roller arrangement 1, 2. The suction pipes 18, 19 are moved back in this case into their inoperative position. The slivers 9, 10 that had previously entered the suction pipes 18, 19 are cut in a predetermined manner and enter the injector nozzles 21, 23 and the false-twisting nozzles 22, 24. This operation is triggered by the suction effect of the injector nozzles 21, 23 in certain embodiments. In certain embodiments, this process also is supported by providing a pneumatic gripper 43 that is shown by an interrupted line in FIG. 2, and that is connected to a vacuum line 44 which is applied to the outlet of the false-twisting nozzles 22, 24. The pneumatic suction gripper 43 supports the intake of the slivers 9, 10 into the pneumatic false-twisting devices 25, 26 and receives the slivers 9, 10 jointly.

The suction gripper 43, with the two slivers 9, 10 or the already prestrengthened slivers 27, 28, is then moved from the outlet of the false-twisting nozzles 22, 24 to the wind-up device 3, in which case it places the jointly withdrawn, prestrengthened slivers 27, 28 between the yarn guides 29, 30, the opened pair of withdrawal rollers 31, 32 and the balancing device 33. In this case, the pair of withdrawal rollers 31, 32 must only be opened for a short time. This opening may be effected in preferred exemplary embodiments, manually in the case of a manual piecing, or by means of a movable servicing unit for automated piecing. For this purpose, it is sufficient that the withdrawal roller 32 that is developed as a pressure roller is arranged on a spring-loaded pivoted lever.

As a rule, it may be assumed that in the practical operation, yarn breakages occur very infrequently, so that the absence of a sliver 9 or 10 and/or of the prestrengthened sliver 27 and 28 is the result of the fact that the sliver supply is used up. Since this frequently coincides with the situation that also in this case there is a full or almost full feed spool 37, a spool change takes place also in the case of the piecing. This means that an empty spool shell is placed in the wind-up device 3 around which the double yarn 4 is placed that is withdrawn by means of the suction gripper 43, after which the spool shell is placed onto the wind-up roller 38. Such an exchange of the feed spool 37 for an empty spool shell can also take place after a sliver breakage so that then not always equally large feed spools 37 are provided for the subsequent twisting, which as a rule is not particularly disturbing.

In the case of another embodiment, it is provided that from the feed spool 37 that is lifted off into the position 37', one end of the prestrengthened slivers 27, 28 that are wound up as a double yarn 4 is withdrawn and is connected with the double yarn 4 fed by the suction gripper 43, then the feed spool 37 is placed back onto the wind-up roller 38 and the winding-up is continued. A pneumatic splicing is particularly suitable for this type of connecting, during which the double yarn end withdrawn from the feed spool 37' and the double yarn withdrawn from the suction gripper 43 are inserted into the splicing device and are spliced there.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A piecing process for piecing prestrengthened slivers formed in a unit of the type having drafting roller means for supplying a pair of drafted slivers, pneumatic false twisting means for forming prestrengthened slivers from the pair of drafted slivers, prestrengthened sliver withdrawing means for withdrawing the prestrengthened slivers from the false twisting means and joint sliver wind-up means for jointly winding up the pair of prestrengthened slivers to form feed spools of multiple wound prestrengthened slivers which can be used in subsequent twisting operations or the like to form commercially usable yarn, said process comprising the sequential steps of starting the supply of the pair of drafted slivers by the drafting roller means, inserting the pair of drafted slivers into the false twisting means.

jointly gripping the pair of slivers at the outlet end of the false twisting means, and inserting the slivers into the withdrawing means were they are fed to the wind-up means.

2. A process according to claim 1, wherein said inserting comprises using suction device sliver transfer means to first suck off the slivers from the drafting roller means and then to transfer them from the suction device sliver transfer means to a position where they are sucked into the false twisting means.

3. A process according to claim 2, wherein the suction device sliver transfer means are brought into the area of pairs of delivery rollers of the drafting roller means and are subsequently moved out of this area, in which case the false twisting means are moved into the area of the pairs of delivery rollers and then take over the slivers subsequent to movement of the suction device sliver transfer means out of this area.

4. A process according to claim 3, wherein the false twisting means, are acted upon by compressed air and automatically take in the slivers at least as soon as they are located in the area of the pairs of delivery rollers of the drawing roller means.

5. A process according to claim 1, wherein the jointly gripping of the pair of slivers at the outlet of the false-twisting means utilizes suction gripper means that receives both slivers and by means of which the slivers are jointly placed in the withdrawing means and are guided to the wind-up means.

6. A process according to claim 2, wherein the jointly gripping of the pair of slivers at the outlet of the false-twisting means utilizes suction gripper means that receives both slivers and by means of which the slivers are jointly placed in the withdrawing means and are guided to the wind-up means.

7. A process according to claim 1, wherein for each piecing operation, an empty spool shell is placed in the wind-up means to which the slivers are transferred that are fed jointly during the piecing.

8. A process according to claim 1, wherein the slivers that, during the piecing, are taken over jointly at the outlet of the false-twisting means, before the renewed winding-up, are connected with sliver ends that are withdrawn from the produced feed spool.

9. A process according to claim 1, wherein the presence of the slivers is monitored in the area behind the false-twisting means, and wherein in the case of a breakage of one or both slivers, the feeding of both slivers is interrupted.

10. A process according to claim 1, wherein the slivers are monitored before entering the drafting roller means, and in that if one sliver is absent, the further supply of the drafting roller means is interrupted.

11. A process according to claim 1, wherein when the supply of the sliver in interrupted, the false-twisting means are moved out of the area of pairs of delivery rollers of the drafting roller means, and means for aiding in the inserting of the pair of drafted slivers into the false-twisting means are moved into this area.

12. A process according to claim 1, wherein when the supply of slivers is interrupted, the withdrawal means are opened up and are not closed before the slivers are inserted during the piecing.

13. A process according to claim 1, wherein the drafting roller means are opened up for the interruption of the supply of the slivers.

14. A process according to claim 1, wherein for the interruption of the supply, the slivers are clamped into the drafting roller means before the insertion thereof into the false twisting means.

*15. A piecing process for piecing yarn components formed in a unit of the type having drafting means for supplying a plurality of drafted slivers, false twisting means for forming a plurality of yarn components from the plurality of drafted slivers, and joint feed spool forming means for forming feed spools with the plurality of yarn components jointly wound adjacent one another, which feed spools can be used in subsequent twisting operations or the like, said piecing process comprising the sequential steps of:*

*starting the supply of the plurality of drafted slivers by the drafting means,*

*inserting the plurality of drafted slivers into the false twisting means;*

*gripping the plurality of yarn components at the outlet end of the false twisting means, and*

*transferring the plurality of yarn components to the joint feed spool forming means.*

*16. A piecing process according to claim 15, comprising supplying the yarn components transferred to the joint feed spool forming means to an empty spool shell to thereby facilitate a doffing operation with exchange of an empty spool shell for a completed feed spool.*

*17. A piecing process according to claim 15, comprising jointly winding up the plurality of yarn components onto a feed spool using wind-up means of the joint feed spool forming means.*

*18. A piecing process according to claim 17, comprising transferring the yarn components transferred to the joint feed spool forming means to the wind-up means.*

*19. A piecing process according to claim 18, comprising supplying the yarn components transferred to the joint feed spool forming means to an empty spool shell to thereby facilitate a doffing operation with exchange of an empty spool shell for a completed feed spool.*

*20. A piecing process according to claim 17, wherein the joint feed spool forming means includes withdrawing means disposed between the outlet end of the false twisting means and the wind-up means, and wherein said transferring of the yarn components includes movement of a gripping means which performs said gripping to a position adjacent an inlet to the withdrawing means.*

*21. A piecing process according to claim 20, comprising supplying the yarn components transferred to the joint feed spool forming means to an empty spool shell to thereby facilitate a doffing operation with exchange of an empty spool shell for a completed feed spool.*

*22. A piecing process according to claim 20, wherein when the supply of slivers is interrupted, the withdrawal means are opened up and are not closed before the slivers are inserted during the piecing.*

*23. A piecing process according to claim 15, comprising supplying the yarn components transferred to the joint feed spool forming means to a splicing means for a splicing connection with previously spun yarn components.*

*24. A piecing process according to claim 23, wherein said previously spun yarn components are withdrawn from a partially completed feed spool.*

*25. A piecing process according to claim 23, wherein said splicing means is a pneumatic splicing means.*

*26. A piecing process according to claim 15, wherein said plurality of drafted slivers and yarn components is a pair of drafted slivers and yarn components.*

*27. A piecing process according to claim 26, wherein said inserting comprises using suction device sliver transfer means to first suck off the slivers from the drafting means and then to transfer them from the suction device sliver transfer means to a position where they are sucked into the false twisting means.*

*28. A piecing process according to claim 25, comprising bringing the suction device sliver transfer means into the area of pairs of delivery means of the drafting means and moving the suction device sliver transfer means out of this area, in which case the false twisting means are moved into the area of the pairs of delivery means and then take over the slivers subsequent to movement of the suction device sliver transfer means out of this area.*

*29. A piecing process according to claim 28, comprising supplying compressed air to the false twisting means such that they automatically take in the slivers at least as soon as they are located in the area of the pairs of delivery means of the drafting means.*

*30. A piecing process according to claim 26, wherein said gripping includes jointly gripping the pair of yarn components, and wherein the joint feed spool forming means includes wind-up means for jointly winding up the pair of yarn components onto a feed spool and withdrawing means*

*disposed between the outlet of the false twisting means and the wind-up means.*

*31. A piecing process according to claim 30, wherein the jointly gripping of the pair of slivers at the outlet of the false-twisting means utilizes suction gripper means that receives both yarn components and by means of which the yarn components are jointly placed in the withdrawing means and are guided to the wind-up means.*

*32. A piecing process according to claim 31, wherein said inserting comprises using suction device sliver transfer means to first suck off the slivers from the drafting means and then to transfer them from the suction device sliver transfer means to a position where they are sucked into the false twisting means.*

*33. A piecing process according to claim 32, wherein the suction device sliver transfer means are brought into the area of pairs of delivery means of the drafting means and are subsequently moved out of this area, in which case the false twisting means are moved into the area of the pairs of delivery means and then take over the slivers subsequent to movement of the suction device sliver transfer means of this area.*

*34. A piecing process according to claim 33, comprising supplying compressed air to the false twisting means such that they automatically take in the slivers at least as soon as they are located in the area of the pairs of delivery means of the drafting means.*

*35. A piecing process according to claim 26, comprising monitoring the presence of the yarn component in the area behind the false-twisting means, and wherein the case of a breakage of one or both yarn components, the feeding of both slivers is interrupted.*

*36. A piecing process according to claim 26, wherein the slivers are monitored before entering the drafting means, and wherein if one sliver is absent, the further supply of the drafting means is interrupted.*

*37. A piecing process according to claim 26, wherein when the supply of the slivers is interrupted, the false-twisting means are moved out of the area of the drafting means, and means for aiding in the inserting of the pair of drafted slivers into the false-twisting means are moved into this area.*

*38. A piecing process according to claim 15, comprising opening up the drafting means for the interruption of the supply of slivers prior to a piecing operation.*

*39. Piecing apparatus for piecing yarn components formed in a unit having:*

*drafting means for supplying a plurality of drafted slivers,*

*false twisting means for forming a plurality of yarn components from the plurality of drafted slivers,*

*and joint feed spool forming means for forming feed spools with the plurality of yarn components, which feed spools can be used in subsequent twisting operations or the like,*

*said piecing apparatus comprising:*

*starting means for starting the supply of the plurality of drafted slivers by the drafting means,*

*inserting means for inserting the plurality of drafted slivers into the false twisting means,*

*gripping means for gripping the plurality of yarn components at the outlet end of the false twisting means, and*

*transferring means for transferring the plurality of yarn components to the joint feed spool forming means.*

*40. Piecing apparatus according to claim 39, wherein the transferring means includes means for supplying the yarn components to an empty spool shell to thereby facilitate a doffing operation with exchange of an empty spool shell for a completed feed spool.*

*41. Piecing apparatus according to claim 39, wherein the joint feed spool forming means includes wind-up means for jointly winding up the plurality of yarn components onto a feed spool.*

*42. Piecing apparatus according to claim 41, wherein the joint feed spool forming means includes withdrawing means disposed between the outlet end of the false twisting means and the wind-up means, and wherein said transferring means includes means for movement of the gripping means to a position adjacent an inlet to the withdrawing means.*

*43. Piecing apparatus according to claim 39, comprising a splicing means, wherein the yarn components transferred to the joint feed spool forming means are supplied to the splicing means for a splicing connection with previously spun yarn components.*

*44. Piecing apparatus according to claim 43, wherein said splicing means is a pneumatic splicing means.*

*45. Piecing apparatus according to claim 39, wherein said plurality of drafted slivers and yarn components is a pair of drafted slivers and yarn components.*

*46. Piecing apparatus according to claim 45, comprising a splicing means, wherein the yarn component transferred to the joint feed spool forming means are supplied to the splicing means for a splicing connection with previously spun yarn components, and wherein said splicing means is a pneumatic splicing means.*

*47. Piecing apparatus according to claim 45, wherein said plurality of drafted slivers and yarn components is a pair of drafted slivers and yarn components.*

* * * * *